(12) United States Patent
Schatvet et al.

(10) Patent No.: US 9,100,579 B2
(45) Date of Patent: Aug. 4, 2015

(54) MODIFICATION OF A VIDEO SIGNAL OF AN OBJECT EXPOSED TO AMBIENT LIGHT AND LIGHT EMITTED FROM A DISPLAY SCREEN

(71) Applicant: CISCO TECHNOLOGY, INC., San Jose, CA (US)

(72) Inventors: Petter Schatvet, Sandvika (NO); Per Ove Husoy, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 116 days.

(21) Appl. No.: 13/709,631

(22) Filed: Dec. 10, 2012

(65) Prior Publication Data

US 2014/0160314 A1   Jun. 12, 2014

(51) Int. Cl.
*H04N 9/73*  (2006.01)
*H04N 5/235*  (2006.01)
*H04N 7/14*  (2006.01)

(52) U.S. Cl.
CPC ............. *H04N 5/2351* (2013.01); *H04N 7/142* (2013.01); *H04N 7/147* (2013.01); *H04N 9/73* (2013.01)

(58) Field of Classification Search
CPC ............................... H04N 9/735; H04N 5/243
USPC .................................. 348/223.1, 225.1, 227.1
See application file for complete search history.

(56) References Cited

U.S. PATENT DOCUMENTS

| | | | |
|---|---|---|---|
| 8,553,103 B1 * | 10/2013 | Samadani et al. | 348/223.1 |
| 2011/0211073 A1 * | 9/2011 | Foster | 348/164 |
| 2012/0051631 A1 * | 3/2012 | Nguyen et al. | 382/164 |
| 2013/0050233 A1 * | 2/2013 | Hirsch | 345/589 |

* cited by examiner

*Primary Examiner* — Twyler Haskins
*Assistant Examiner* — Quang Le
(74) *Attorney, Agent, or Firm* — Lempia Summerfield Katz LLC

(57) ABSTRACT

A method that includes obtaining a video signal of an object by a camera, obtaining an ambient light signal representing ambient light, obtaining a display signal representing light emitted by a display, obtaining a distance signal representing a distance between the display and the object, and modifying the video signal based on the ambient light signal, the display signal, and the distance signal, to obtain a modified video signal.

17 Claims, 4 Drawing Sheets

MODIFICATION OF A VIDEO SIGNAL OF AN OBJECT EXPOSED TO AMBIENT LIGHT AND LIGHT EMITTED FROM A DISPLAY SCREEN

TECHNICAL FIELD

The present disclosure relates in general to video communication. More specifically, the present disclosure relates to a method and apparatus for providing a modified video signal of an object exposed to ambient light and light emitted from a display screen.

BACKGROUND

Video-conferencing is an emerging manner of communication between individuals or groups of individuals, and is often used as a valuable replacement for traditional meetings. In video-conferencing, video and audio signals are captured at a number of video-conferencing terminals, often referred to as endpoints. The video and audio signals captured at an endpoint are transferred through a communication network, then usually processed by video-conferencing equipment operatively connected to the network, and finally reproduced on at least one remote video-conferencing endpoint. The experienced quality of video-conferencing systems may depend on the illumination of an object which is captured by a camera at one video-conferencing endpoint and reproduced on a display at another video-conferencing endpoint. In particular, the light emitted by a display screen in a video-conferencing endpoint may introduce disturbing color changes in the video signal captured by that endpoint's camera.

BRIEF DESCRIPTION OF THE DRAWINGS

A more complete appreciation of the exemplary embodiments described herein and many of the attendant advantages thereof will be readily obtained as the same becomes better understood by reference to the following detailed description when considered in connection with the accompanying drawings, wherein.

DESCRIPTION OF EXAMPLE EMBODIMENTS

Overview

In an exemplary embodiment, a method is described that includes obtaining a video signal of an object by a camera, obtaining an ambient light signal representing ambient light, obtaining a display signal representing light emitted by a display, obtaining a distance signal representing a distance between the display and the object, and modifying the video signal based on the ambient light signal, the display signal, and the distance signal, to obtain a modified video signal.

Exemplary Embodiments

Figure 1:
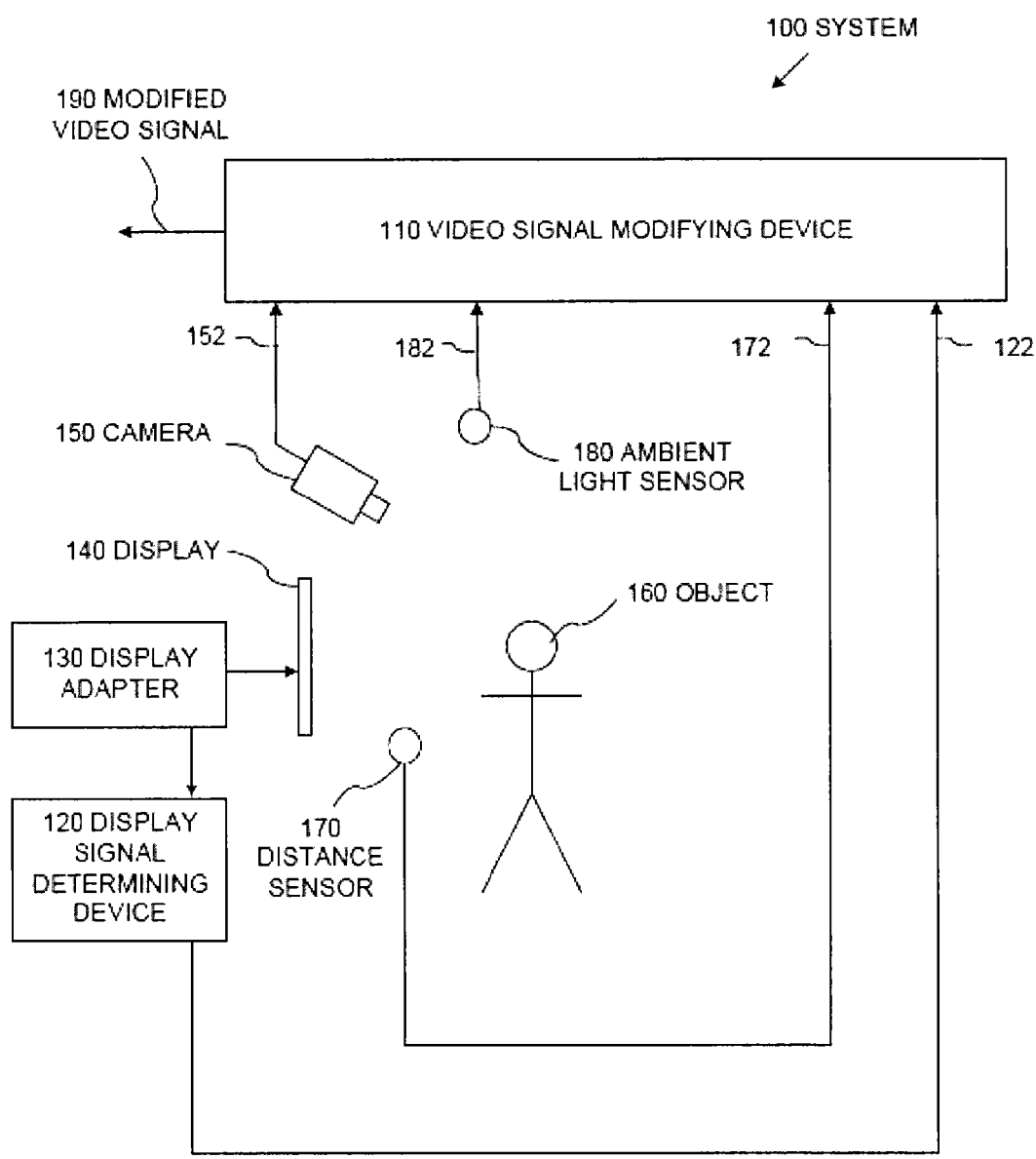
FIG. 1 is an example schematic block diagram illustrating principles of an example system for providing a modified video signal of an object exposed to ambient light and light emitted from a display screen.

FIG. 1 is a schematic block diagram illustrating principles of a system 100 for providing a modified video signal 190 of an object 160 exposed to ambient light and light emitted from a display 140.

The display 140 may be any type of electronic output device operable to present visual information. According to an embodiment, the display 140 may be operable to present video information to a user, or more specifically, to present video-conference content to a video-conference participant. The display 140 may be a LCD, LED, OLED, TFT or plasma display, which may be provided as a detached, separate device, or included in a terminal equipment such as a video-conference endpoint or a handheld terminal such as a portable computer, tablet computer, smartphone, etc.

The object 160 which is exposed to light emitted from the display 140 may be a conference participant (i.e. a user of the terminal equipment), or at least include a face of a conference participant.

The system 100 comprises a camera 150 which is configured to capture a video signal of the object 160, hereinafter referred to as non-modified video signal 152.

The camera 150 may be a digital video camera, which may use a CMOS or CCD two-dimensional sensor chip as a photosensitive element. The non-modified video signal 152 provided by the camera 150 contains information about the image captured by the camera 150 with respect to time.

The non-modified video signal 152 may include information representing a time sequence of frames, wherein each frame may be a two-dimensional array of vectors, each vector including a number of values (e.g., three values) which represent the intensity of a particular color of each pixel in the image. Such vectors may be RGB-vectors, and each RGB-vector may correspond to a pixel in one video frame. For practical purposes, and in particular, for utilizing the signal's spatial and temporal redundancy, the non-modified video signal 152 may be coded in accordance with a coding protocol such as MPEG-2 or MPEG-4. However, uncoded video may be used, which avoids a need to decode the video in order to be able to individually correct a pixel.

The system 100 may further include an ambient light sensor 180 which provides an ambient light signal 182 representing the ambient light. In one embodiment, the ambient light sensor 180 may be located on or around the display 140, or on or around the camera 150. The ambient light sensor 180 may be calibrated based on its location. The ambient light signal 182 provided by the ambient light sensor 180 may include information about the color and/or intensity of the ambient light. According to an embodiment, the ambient light signal 182 may be represented by a vector with three components, the components indicating the intensity of red, green, and blue light contribution, respectively.

The ambient light may be a sum of light from various light sources. The source of the ambient light may be daylight such as sunlight passing through windows, and/or light reflected from walls, ceiling, floor, interior, and alike. The source of the ambient light may also be lamps or any other illuminating device.

According to an embodiment, the ambient light sensor 180 may include a group of semiconductor photo-detectors, such as silicone photo-diodes. Alternatively, the ambient light sensor 180 may be a group or an array of semiconductor photo-detectors such as photo-diodes, CMOS, or CCD devices. The ambient light sensor 180 may be selected as an optical sensor responsive to an appropriate range of colors and intensities in the ambient light.

A display signal determining device 120 is configured to provide a display signal 122 representing a measure of the light emitted by the display 140. The display signal determining device 120 will be described in more detail later.

A distance sensor 170 may be configured to provide a distance signal 172 representing a measure of the distance between the display 140 and the object 160. In one embodiment, the distance sensor 170 may be located on or around the display 140, or on or around the camera 150 which is on or around the display 140.

The distance sensor 170 may include an ultrasonic distance sensor, an infra-red distance sensor, a time of flight camera, or other depth measuring camera. Alternatively, a measurement equipment based on triangulation principles may be used as a part of the distance sensor 170.

Figure 2:
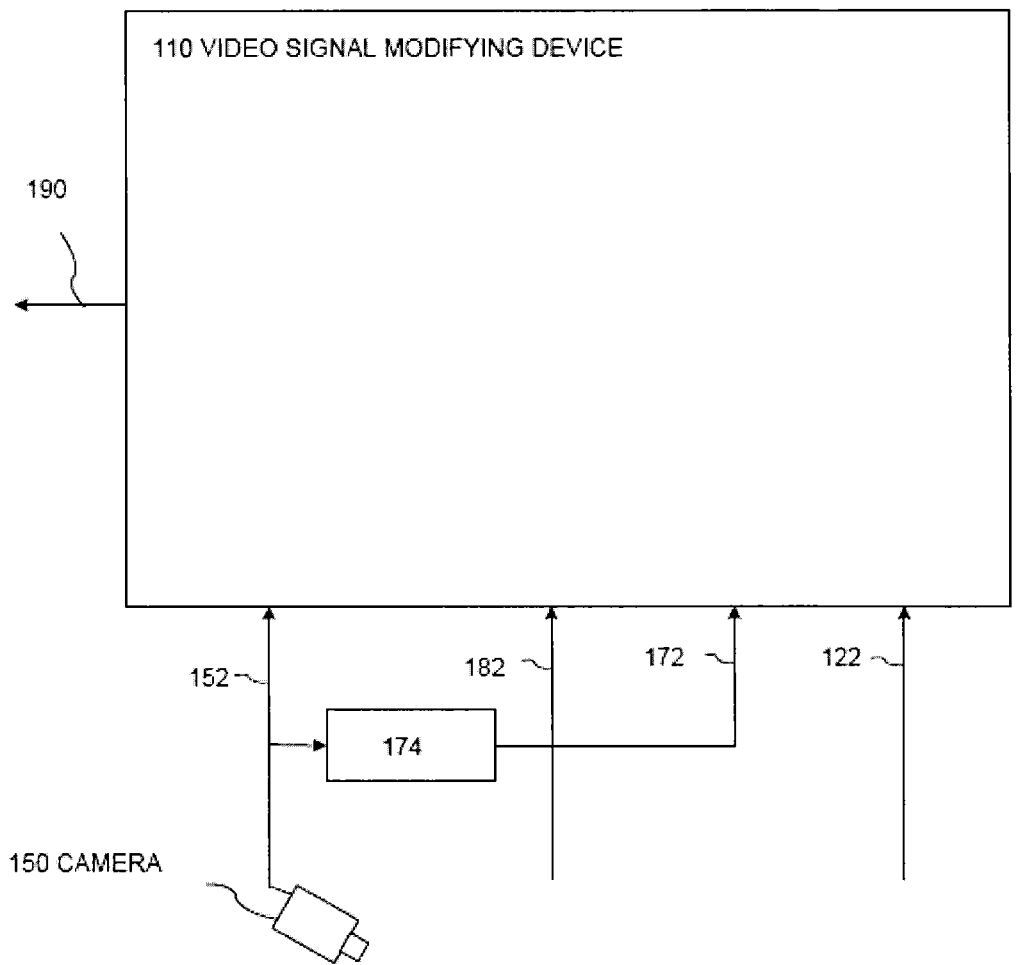
FIG. 2 is an example schematic block diagram of an alternative embodiment for distance measurement in a video signal modifying device.

Alternatively, and as shown in FIG. 2, the distance signal 172 representing a measure of the distance between the display 140 and the object 160 may be determined via a distance determining device 174 which may include a processing device configured to analyze the non-modified video signal 152 and determine the distance based on the non-modified video signal 152.

Further, in order to provide the modified video signal 190 as an output, the system 100 includes a video signal modifying device 110, which is configured to modify the non-modified video signal 152 based on one or more of the ambient light signal 182, the display signal 122, and the distance signal 172. The video signal modifying device 110 generates the modified video signal 190 and is explained in more detail below. Details of the video signal modifying device 110 will be later described with reference to FIG. 4.

The system 100 may, according to an embodiment, further include a segmenting device. The segmenting device may be configured to segment the non-modified video signal 152 into a near segment and a far segment, based on the distance signal 172. A portion of the image which corresponds to a close distance between the display 140 and the object 160, e.g., a distance less than a certain distance threshold, may be determined as the close segment, while the remaining portion of the image may be determined as the far segment. In one embodiment, such a distance threshold may be in the range of 30 cm to 4 m, depending on the size of the display 140 and/or other circumstances. As an illustrative example, if the system is implemented as, or makes use of, a small handheld video-conference terminal, the distance threshold determining the close segment may for example be in the range of 30 cm to 100 cm, while if the system is implemented as, or makes use of, a large video-conference endpoint for a conference room, the distance threshold distinguishing between the close and far segments may for example be in the range of 200 cm to 400 cm.

According to an embodiment, the video signal modifying device 110 may be configured to change the color balance of a first portion (i.e., first group of pixels) of the non-modified video signal 152 which corresponds to the near segment. The video signal modifying device 110 may further be configured to maintain unaltered the color balance of a second portion (i.e., second group of pixels) of the non-modified video signal 152 which corresponds to the far segment.

Alternatively, the video signal modifying device 110 may further be configured to change the color balance of the second portion (i.e., second group of pixels) of the non-modified video signal 152 which corresponds to the far segment.

According to an embodiment, the display signal determining device 120 may include a connection to a display adapter 130 which supplies a signal to the display 140. In such an embodiment, the display signal determining device 120 may be configured to determine a representative color of the signal supplied to the display 140 by the display adapter 130. The display signal determining device 120 may also be configured to determine a representative intensity of the signal supplied to the display 140.

The display signal 122 may be averaged or summed over an area representing a frame of the video signal. The display signal 122 may, e.g., as a function of time, include information relating to a representative average (averaged over the display area) color and intensity of the signal supplied to the display 140, or a set of a number of intensities (e.g., three) representing certain primary colors of the signal (e.g., RGB). Such display signal 122 may include information representative of at least the color and intensity of the display's 140 contribution in the light illuminating the object 160.

As an illustrative example, the object 160 may include a face of a conference participant. The representation of the object 160, as transmitted to other network elements in the video-conferencing system, may be presented to other conference participants such that it does not involve extensive distortion caused by changes in the light emitted by the display 140 which is arranged in front of, and may be close to, the conference participant's face. In particular, the color balance of the face, as captured by the camera 150 and modified in the video signal modifying device 110, i.e. the modified video signal 190, may preferably be essentially unaltered despite any changes in the colors and/or intensity of the light emitted by the display 140.

Hence, at least a representative color and/or intensity of the signal supplied to the display 140 by the display adapter 130, or a set of intensities of primary colors, may be provided in the display signal determining device 120. The display signal 122 generated by the display signal determining device 120 is provided as an input to the video signal modifying device 110.

Also, the ambient light signal 182 provided by the ambient light sensor 180 is provided as an input to the video signal modifying device 110.

Further, the distance signal 172 representing the distance between the display 140 and the object 160 is provided as an input to the video signal modifying device 110. This distance signal 172 may be provided by an analysis of the non-modified video signal 152 provided by the camera 150. The analysis may e.g. be implemented as a focus distance analysis performed by the distance determining device 174.

Alternatively, the distance signal 172 may be provided by the distance sensor 170 and an analysis of the non-modified video signal 152 provided by the camera 150.

A segmenting device may further be configured to segment the non-modified video signal 152 into a near segment and a far segment, based on the distance signal 172. In this particular example, the near segment may correspond to the object 160, i.e., the face of the participant, while the far segment may correspond to the remaining parts of the video image captured by the camera 150, such as the background.

The video signal modifying device 110 may, according to an embodiment, be configured to change the color balance of a first portion of the non-modified video signal 152 which corresponds to the near segment, i.e., the representation of the participant's face. The changing of color balance may, e.g., include a white point correction.

The video signal modifying device 110 may further be configured to maintain unaltered the color balance of a second portion of the non-modified video signal 152 which corresponds to the far segment, i.e., the background.

As a result, changes in the display's 140 contribution in the light illuminating the object 160, i.e., the participant's face, and in particular changes in the color of the light illuminating the object 160, may effectively be compensated without altering the color balance of the background, which is less affected by the light originating from the display 140, due to its more extensive distance from the display 140.

The methods and systems of the present disclosure may lead to a significant reduction in the disturbing influence of changes in the light emitted by the display 140 in a videoconferencing system.

FIG. 2 is an example schematic block diagram of an alternative embodiment for distance measurement in the video signal modifying device 110. The disclosure of the system and its elements already described with reference to FIG. 1 is also applicable for the description of FIG. 2.

In the example embodiment illustrated in FIG. 2, the distance signal 172 is provided by a distance determining device 174 which calculates a distance based on the non-modified video signal 152. Alternatively, the distance determining device 174 may also include a distance sensor 170 as has been described with reference to FIG. 1 above.

The distance determining device 174 may, e.g., include a focus distance analysis device.

The distance determining device 174 may be implemented separately from the video signal modifying device 110, as schematically illustrated in FIG. 2. Alternatively, the distance determining device 174 may be implemented as an integrated part of the video signal modifying device 110. In the latter case, the distance determining device 174 may use the same signal processing devices and other resources as the other parts of the video signal modifying device 110.

The ambient light signal 182 may be considered as a vector with three components. These components may indicate the intensity of red, green, and blue light contribution in the ambient light.

The display signal 122, may be considered as a vector with three components indicating the intensity of red, green, and blue light contribution in the light emitted by the display 140, which may be averaged or summed over at least a portion of the display 140.

The total light incident on the object 160 may be considered as a sum of the contributions from ambient light as represented by the ambient light signal 182, and the contribution emitted from the display 140 as represented by the display signal 122.

The ambient light signal 182 may be measured by the ambient light sensor 180. Although the ambient light signal 182 is measured at the ambient light sensor 180, the value of the ambient light signal 182 may also be representative of the ambient light contribution incident on the object 160, e.g. by locating the ambient light sensor 180 sufficiently close to the object 160.

The distance signal 172 may be indicative of e.g. one or more of the distance between the display 140 and the object 160, the distance between the display 140 and a portion of the object 160, and the distance between the display 140 and a portion of the object 160 corresponding to a picture element (pixel) in the non-modified video signal 112 captured by the camera 150.

The video signal modifying device 110 may include a processing device which is configured to process one or more of the ambient light signal 182, the distance signal 172, and the display signal 122, in a first processing stage.

The result of the first processing stage may be the establishing of a close segment and a far segment in the non-modified video signal 152 provided by the camera 150.

According to an embodiment, the first processing stage may establish an area of the non-modified video signal 152 which represents the face of a conference participant as the close segment, while the remaining area of the non-modified video signal 152 may be established as representing the far segment.

Based on the result of this first processing stage, the non-modified video signal 152 may be processed in a second processing stage.

In the second processing stage, the close segment may be subject to a color correction, while the intensity and color of the far segment may remain unaltered.

According to an embodiment, the close segment may be subject to a white balance processing, while the intensity and color of the far segment may remain unaltered.

According to an embodiment, the close segment is subject to a white balance processing with a white point that depends on the ambient light signal 182 and the display signal 122, while the far segment is subject to a white balance processing with a white point that depends on the ambient light signal 182 only.

According to an embodiment, the non-modified video signal 152 may be considered as a time sequence of frames, wherein each frame may be considered as a two-dimensional array of RGB-vectors. Each RGB-vector corresponds to a pixel in one video frame. The video signal modifying device 110 may be configured to perform a modifying step wherein the non-modified video signal 152 may be subject to a transformation, wherein each RGB-vector corresponding to a pixel, hereafter denoted a pixel vector, is multiplied with a modifying matrix.

According to an embodiment, wherein the non-modified video signal 152 is segmented into a near segment and a far segment, two different modifying matrices M1 and M2 may be employed in the processing performed by the video signal modifying device 110. A first modifying matrix M1 may be used for transforming each pixel vector included in the near segment of the non-modified video signal 152, while a second modifying matrix M2 may be used for transforming each pixel vector included in the far segment of the non-modified video signal 152.

According to an embodiment, the values of the elements of the first modifying matrix M1 may be set in order to improve the color balance of the near segment of the non-modified signal.

According to an embodiment, the values of the elements of the first modifying matrix M1 may be selected in order to improve the white balance of the near segment of the non-modified video signal 152.

In an example wherein the near segment corresponds to an object in the form of a face of a human conference participant, the white balance of the face may be improved in the modified video signal 190. In particular, the white balance of the reproduction of the face in the modified video signal 190 may be less dependent on variations in light contribution from the display 140 which is arranged in front of the conference participant.

The values of the elements of the second modifying matrix M2 may be set based on the ambient light signal 182, i.e., the measured ambient light. According to an embodiment, the values of the elements of the second modifying matrix M2 may be independent of the display signal 122.

According to an embodiment, the values of the elements of the first modifying matrix M1 and/or the second modifying matrix M2 may be determined based on previously acquired measurement data. The previously acquired measurement data may correspond to known display signals, e.g., a white display signal with equal R, G, and B components, or multiple display signals with only R, G, or B component. The previously acquired measurement data may also correspond to one or more known distances from the display. A calibration curve may be used to determine the values of the elements of the first modifying matrix M1 and/or the second modifying matrix M2 based on the previously acquired measurement data, the distance signal 172, and the display signal 122. The values of the elements of the first modifying matrix M1 and/or the second modifying matrix M2 may be determined such that M1 and M2 correspond to a white point transform such as a Bradford transform.

The video signal modifying device 110 may be configured to repeat its processing or to terminate the processing as appropriate.

Figure 3:
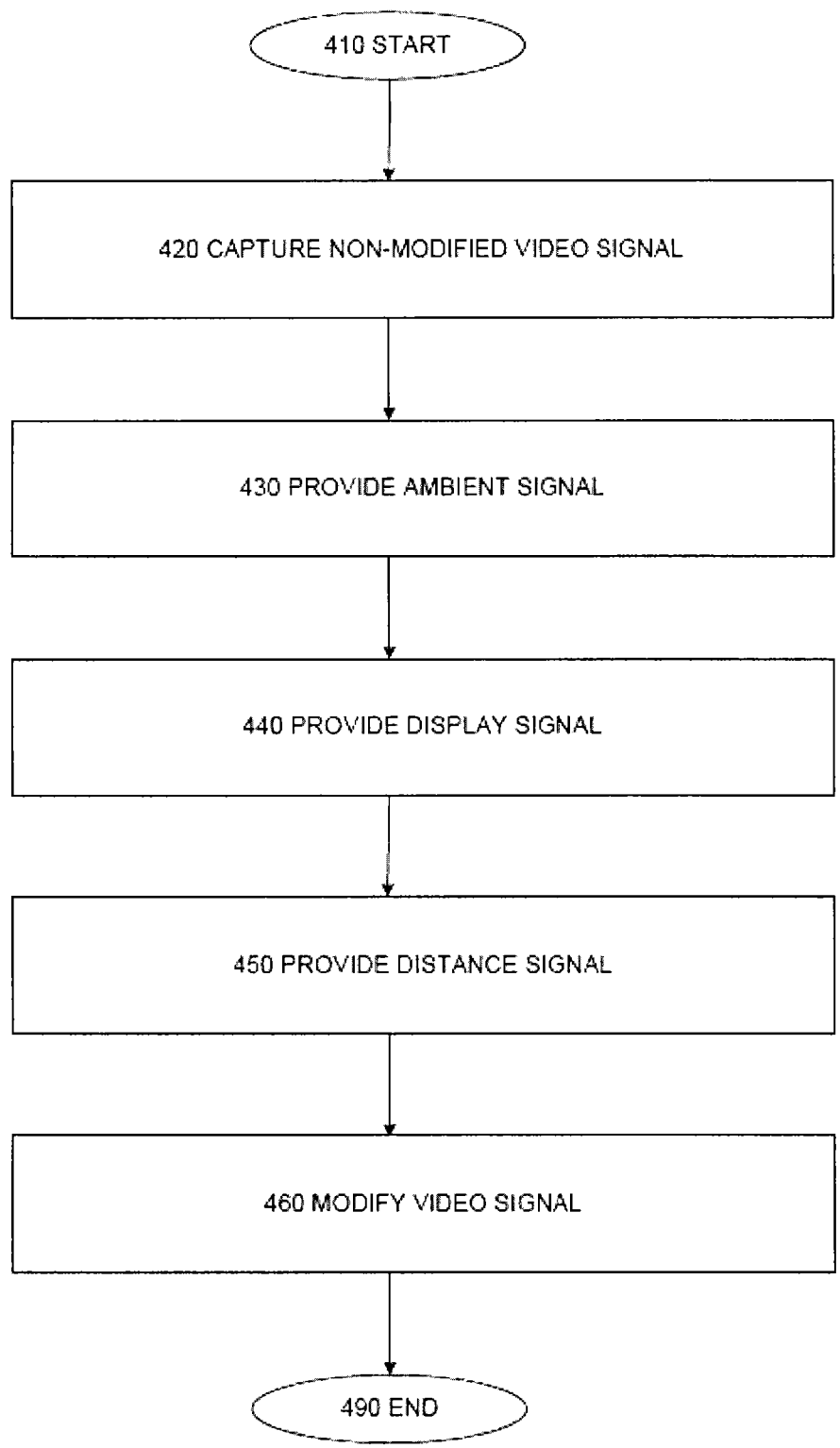
FIG. 3 is an example schematic flowchart illustrating principles of an example method for providing a modified video signal of an object exposed to ambient light and light emitted from a display.

FIG. 3 is an example schematic flowchart illustrating principles of an example method for providing the modified video signal 190 of the object 160 exposed to ambient light and light emitted from a display 140.

The method starts at the initiating step 410.

Then, in step 420, a non-modified video signal 152 is captured by the camera 150. Exemplary properties and details of the non-modified video signal 152 and the camera 150 have already been described with reference to FIGS. 1 and 2.

Next, in step 430, the ambient light signal 182, which represents the ambient light, is provided. The ambient light signal 182 may, e.g., be provided by the ambient light sensor 180. Exemplary properties and details of the ambient light signal 182 and the ambient light sensor 180 have already been described with reference to FIGS. 1 and 2. Accordingly, the ambient light signal 182 may include information representing a time series of vectors, each vector having three components indicating the intensity of red, green, and blue light contribution in the ambient light.

Next, in step 440, the display signal 122 which represents the light emitted by the display 140 is provided.

The display signal 122, may be considered as a vector with three components indicating the intensity of red, green, and blue contribution in the light emitted by the display 140, averaged or summed over the display surface.

According to an embodiment, step 440 of providing the display signal 122 which represents the light emitted by the display 140 includes obtaining a signal supplied to the display 140 by the display adapter 130.

According to another embodiment, step 440 of providing a display signal 122 which represents the light emitted by the display 140 may further include determining a representative color of the signal supplied to the display 140 by the display adapter 130.

Next, in step 450, a distance signal 172 representing a distance between the display 140 and the object 160 is provided.

According to an embodiment, step 450 of providing the distance signal 172 may include analyzing the non-modified video signal 152. The analyzing may include focus distance analysis.

According to another embodiment, step 450 of providing the distance signal 172 may include the use of the distance sensor 170, being, e.g., an ultrasonic distance sensor. Such aspects have been further described with reference to FIGS. 1 and 2 above.

According to an embodiment, the distance signal 172 may be used to segment the non-modified video signal 152 into a near segment and a far segment. For instance, step 460 of modifying the non-modified video signal 152 may include changing the color balance of a first portion of the non-modified video signal 152 which corresponds to the near segment, while the color balance of a second portion of the non-modified video signal 152 corresponding to the far segment is maintained unaltered. The changing of color balance may, e.g., include a white point correction.

Next, in the modifying step 460, the non-modified video signal 152 is modified, based on the ambient light signal 182, the display signal 122, and the distance signal 172, to generate the modified video signal 190.

According to an embodiment, the non-modified video signal 152 may be considered as a time sequence of frames, wherein each frame may be considered as a two-dimensional array of RGB-vectors. Each RGB-vector corresponds to a pixel in one video frame. In the modifying step 460, the non-modified video signal 152 may be subject to a transformation, wherein each RGB-vector corresponding to a pixel is multiplied with a modifying matrix.

According to an embodiment, wherein the non-modified video signal 152 is segmented into a near segment and a far segment, two different modifying matrices M1 and M2 may be employed in the modifying step 460. A first modifying matrix M1 may be used for transforming each pixel vector included in the near segment of the non-modified video signal 152, while a second modifying matrix M2 may be used for transforming each pixel vector included in the far segment of the non-modified video signal 152.

According to an embodiment, the values of the elements of the first modifying matrix M1 may be set in order to improve the color balance of the near segment of the non-modified signal 152.

According to an embodiment, the values of the elements of the first modifying matrix M1 may be selected in order to improve the white balance of the near segment of the non-modified video signal 152.

In an example wherein the near segment corresponds to an object in the form of a face of a human conference participant, the white balance of the face may be improved in the modified video signal 190. In particular, the white balance of the reproduction of the face in the modified video signal 190 may be less dependent on variations in light contribution from the display 140 which is arranged in front of the conference participant.

The values of the elements of the second modifying matrix M2 may be set based on the ambient light signal 182, i.e., the measured ambient light. According to an embodiment, the values of the elements of the second modifying matrix M2 may be independent of the display signal 122.

The above-described embodiments may be adapted to correct more than two segments of the non-modified video signal 152, or to correct individual pixels of the non-modified video signal 152.

According to an embodiment, the distance signal 172 may be used to segment the non-modified video signal 152 into three or more segments, and each segment may be independently corrected via a corresponding modifying matrix, where the modifying matrix depends on the corresponding contributions of the display signal 122 and the ambient light signal 182 for that segment.

According to an embodiment, one or more pixels of the non-modified video signal 152 may be independently corrected via corresponding modifying matrices, where the modifying matrix of a pixel depends on the corresponding contributions of the display signal 122 and the ambient light signal 182 for that pixel.

One or more of the above steps may be repeated as appropriate, or terminated at the terminating step 490.

Figure 4:
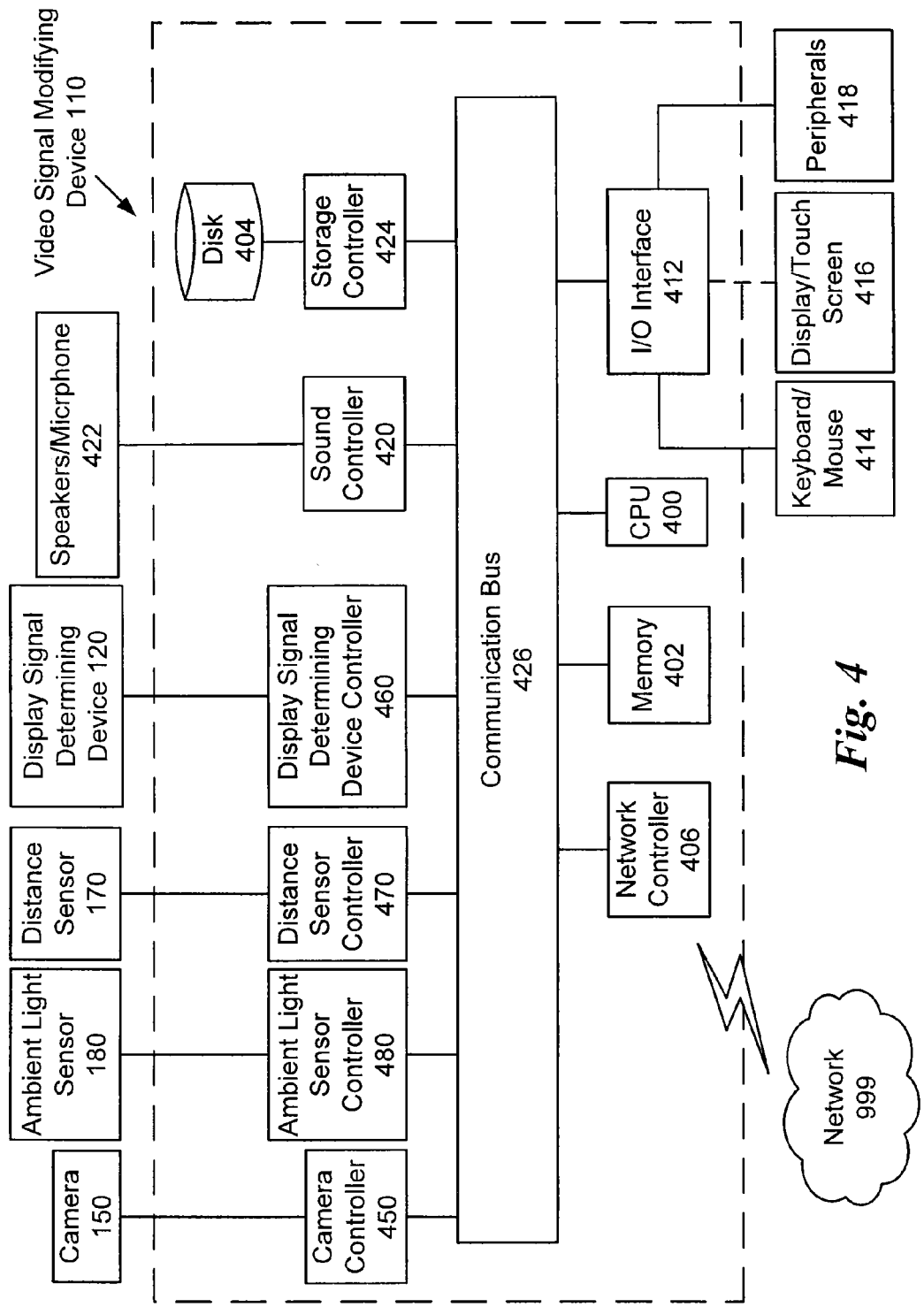
FIG. 4 is an example schematic block diagram of an embodiment of a video signal modifying device.

Next, a hardware description of the video signal modifying device 110 according to exemplary embodiments is described with reference to FIG. 4. In FIG. 4, the video signal modifying device 110 includes a CPU 400 which performs the processes described above. The process data and instructions may be stored in memory 402. These processes and instructions may also be stored on a disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the video signal modifying device 110 communicates, such as a server or a computer.

Further, the claimed advancements may be provided as a utility application, background daemon, or component of an operating system, or combination thereof, executing in conjunction with CPU 400 and an operating system such as Microsoft Windows 7, UNIX, Solaris, LINUX, Apple MAC-OS and other systems known to those skilled in the art.

CPU 400 may be a Xenon or Core processor from Intel of America or an Opteron processor from AMD of America, or may be other processor types that would be recognized by one of ordinary skill in the art. Alternatively, CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above.

The video signal modifying device 110 in FIG. 4 also includes a network controller 406, such as an Intel Ethernet PRO network interface card from Intel Corporation of America, for interfacing with network 999. As can be appreciated, the network 999 can be a public network, such as the Internet, or a private network such as an LAN or WAN network, or any combination thereof and can also include PSTN or ISDN sub-networks. The network 999 can also be wired, such as an Ethernet network, or can be wireless such as a cellular network including EDGE, 3G and 4G wireless cellular systems. The wireless network can also be WiFi, Bluetooth, or any other wireless form of communication that is known.

The video signal modifying device 110 further includes an I/O interface 412 that interfaces with a keyboard/mouse 414 as well as a display/touch screen 416. I/O interface 412 also connects to a variety of peripherals 418 including printers and scanners, such as an OfficeJet or DeskJet from Hewlett Packard.

A sound controller 420 is also provided in the video signal modifying device 110, such as Sound Blaster X-Fi Titanium from Creative, to interface with speakers/microphone 422 thereby providing sounds and/or music. The speakers/microphone 422 can also be used to accept dictated words as commands for controlling the video signal modifying device 110 or for providing location and/or property information with respect to the target property.

The storage controller 424 connects the disk 404 with communication bus 426, which may be an ISA, EISA, VESA, PCI, or similar, for interconnecting all of the components of the computer.

A camera controller 450 is provided in the video signal modifying device 110 to interface with the camera 150, thereby providing the non-modified video signal 152.

An ambient light sensor controller 480 is provided in the video signal modifying device 110 to interface with the ambient light sensor 180, thereby providing the ambient light signal 182.

A distance sensor controller 470 is provided in the video signal modifying device 110 to interface with the distance sensor 170, thereby providing the distance signal 172.

A display signal determining device controller 460 is provided in the video signal modifying device 110 to interface with the display signal determining device 120, thereby providing the display signal 122.

The exemplary embodiments disclosed herein provide improvements in video-conferencing. According to an embodiment, disturbing influence of light emitted by the display 140 in a video-conferencing system is reduced by the disclosed methods and systems. Further, the technical advancements described herein may be applicable to other fields involving the processing of a video image.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method comprising:
    obtaining a video signal of an object by a photosensitive sensor of a camera;
    obtaining an ambient light signal representing ambient light from an ambient light sensor;
    obtaining a display signal representing a measure of light emitted by a display;
    obtaining a distance signal representing a distance between the display and the object;
    segmenting the video signal into at least a near segment and a far segment based on the distance signal and the video signal; and
    modifying the video signal based on the ambient light signal, the display signal, and the distance signal, to obtain a modified video signal, wherein a color balance of a first portion of the video signal corresponding to the near segment is changed and the color balance of a second portion of the video signal corresponding to the far segment is maintained.

2. The method of claim 1, wherein the obtaining the distance signal includes:
    determining the distance signal based on the video signal.

3. The method of claim 2, wherein the determining the distance signal based on the video signal includes:
    performing focus distance analysis on the video signal.

4. The method of claim 1, wherein the obtaining the distance signal includes:
    determining the distance signal based on a distance reading of a distance sensor.

5. The method of claim 4, wherein the distance sensor is an ultrasonic distance sensor.

6. The method of claim 1, wherein the obtaining the display signal representing the light emitted by the display includes:
    obtaining a signal supplied to the display by a display adapter.

7. The method of claim 6, wherein the obtaining the display signal representing the light emitted by the display further includes:
    averaging or summing emitted light over an area of the display.

8. The method of claim 6, wherein the obtaining the display signal representing the light emitted by the display further includes:
determining a representative color of the signal supplied to the display by the display adapter.

9. A system comprising:
a photosensitive sensor of a camera that generates a video signal of an object;
an ambient light sensor that provides an ambient light signal representing ambient light;
a display signal determining device that provides a display signal representing a measure of light emitted by a display;
a distance determining device that obtains a distance signal representing a distance between the display and the object; and
a video signal modifying device that modifies the video signal based on the ambient light signal, the display signal, and the distance signal, to obtain a modified video signal;
a segmenting device that segments the video signal into at least a near segment and a far segment based on the distance signal,
wherein the video signal modifying device changes a color balance of a first portion of the video signal corresponding to the near segment while maintaining the color balance of a second portion of the video signal corresponding to the far segment.

10. The system of claim 9, wherein the distance determining device determines the distance signal based on the video signal.

11. The system of claim 10, wherein the distance determining device determines the distance signal based on the video signal by performing focus distance analysis on the video signal.

12. The system of claim 9, wherein the distance determining device includes a distance sensor.

13. The system of claim 12, wherein the distance sensor is an ultrasonic distance sensor.

14. The system of claim 9, wherein the display signal determining device obtains a signal supplied to the display by a display adapter.

15. The system of claim 14, wherein the display signal determining device provides a display signal representing the light emitted by the display by averaging or summing emitted light over an area of the display.

16. The system of claim 14, wherein the display signal determining device determines a representative color of the signal supplied to the display by the display adapter.

17. A method comprising:
obtaining a video signal of an object by a camera;
obtaining an ambient light signal representing ambient light;
obtaining a display signal representing light emitted by a display;
obtaining a distance signal representing a distance between the display and the object;
segmenting the video signal into at least a near segment and a far segment based on the distance signal and the video signal; and
modifying the video signal based on the ambient light signal, the display signal, and the distance signal, to obtain a modified video signal, wherein modifying the video signal includes:
changing a color balance of a first portion of the video signal corresponding to the near segment while maintaining the color balance of a second portion of the video signal corresponding to the far segment.

* * * * *